(12) United States Patent
Gonzalez

(10) Patent No.: US 9,353,789 B1
(45) Date of Patent: May 31, 2016

(54) BEARING ASSEMBLIES INCLUDING FLUID RETENTION MECHANISM, BEARING APPARATUSES, AND METHODS OF USE

(71) Applicant: US Synthetic Corporation, Orem, UT (US)

(72) Inventor: Jair Jahaziel Gonzalez, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/310,608

(22) Filed: Jun. 20, 2014

(51) Int. Cl.
*F16C 17/02* (2006.01)
*F16C 17/04* (2006.01)

(52) U.S. Cl.
CPC ...................................... *F16C 17/04* (2013.01)

(58) Field of Classification Search
USPC ............. 384/95, 97, 117, 122, 303, 306, 307, 384/308, 309, 311, 312, 313, 316, 368
See application file for complete search history.

(56) References Cited

U.S. PATENT DOCUMENTS

| | | | | |
|---|---|---|---|---|
| 3,378,319 | A * | 4/1968 | Cutting et al. | 384/100 |
| 4,456,391 | A * | 6/1984 | New | F16C 17/06 384/307 |
| 4,525,083 | A * | 6/1985 | Pedersen | 384/278 |
| 4,732,491 | A * | 3/1988 | Geczy | 384/95 |
| 7,866,418 | B2 | 1/2011 | Bertagnolli et al. | |
| 7,896,551 | B2 | 3/2011 | Cooley et al. | |
| 7,998,573 | B2 | 8/2011 | Qian et al. | |
| 8,034,136 | B2 | 10/2011 | Sani | |
| 8,236,074 | B1 | 8/2012 | Bertagnolli et al. | |
| 2007/0046119 | A1* | 3/2007 | Cooley | F16C 17/02 310/90.5 |

OTHER PUBLICATIONS

U.S. Appl. No. 13/213,382, filed Aug. 19, 2011, Cooley et al.
U.S. Appl. No. 13/480,932, filed May 25, 2012, Tulett et al.
U.S. Appl. No. 13/550,831, filed Jul. 17, 2012, Peterson et al.

* cited by examiner

*Primary Examiner* — Phillip A Johnson
(74) *Attorney, Agent, or Firm* — Dorsey & Whitney LLP

(57) ABSTRACT

Embodiments of the invention are directed to bearing assemblies, bearing apparatuses, and methods of operation thereof. In particular, embodiments include bearing assemblies configured to maintain a fluid at or near bearing surfaces thereof. For example, one or more bearing assemblies of a bearing apparatus may include a fluid retention mechanism that may facilitate fluid retention at or near the bearing surfaces.

23 Claims, 11 Drawing Sheets

BEARING ASSEMBLIES INCLUDING FLUID RETENTION MECHANISM, BEARING APPARATUSES, AND METHODS OF USE

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. Bearing apparatuses (e.g., thrust, radial, tapered, and other types of bearings) also may be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

A typical bearing apparatus includes a stator that does not rotate and a rotor that is attached to the output shaft and rotates with the output shaft. The stator and rotor each includes a plurality of bearing elements, which may be fabricated from polycrystalline diamond compacts ("PDCs") that provide diamond bearing surfaces that bear against each other during use.

The operational lifetime of the bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Embodiments of the invention are directed to bearing assemblies, bearing apparatuses, and methods of operation thereof. In particular, embodiments include bearing assemblies configured to promote maintaining a fluid at or near bearing surfaces thereof. For example, one or more bearing assemblies of a bearing apparatus may include a fluid retention mechanism that may facilitate fluid retention at or near the bearing surfaces. Such fluid may provide a fluid film between bearing surfaces of opposing bearing assemblies of the bearing apparatus. Maintaining a fluid film between opposing bearing surfaces may facilitate hydrodynamic operation of the bearing apparatus.

At least one embodiment includes a bearing assembly that has a support ring and a plurality of bearing elements secured to the support ring. The plurality of bearing elements are positioned about a rotation axis of the support ring, and at least two of the plurality of bearing elements are spaced from one another to define a channel. Additionally, the bearing assembly includes one or more barrier elements secured to the support ring and at least partially obstructing the channel. The one or more barrier elements are positioned near a first opening of the channel.

Embodiments also include a bearing apparatus that has a first bearing assembly, which includes one or more first bearing surfaces. The bearing apparatus also includes a second bearing assembly that includes a support ring and a plurality of bearing elements secured to the support ring. The bearing elements of the second bearing assembly include a plurality of corresponding superhard bearing surfaces engaged with the one or more first bearing surfaces. At least some of the plurality of bearing elements of the second bearing assembly are spaced from an adjacent one of the plurality of bearing elements by a channel. The second bearing assembly also include a fluid retention mechanism sized and configured to retain fluid in the channel.

Additional or alternative embodiments include a method of operating a bearing apparatus. The method includes supplying fluid into one or more channels between bearing elements of one or more of a first bearing assembly or a second bearing assembly of the bearing apparatus. The method also includes rotating one or more of the first bearing assembly or the second bearing assembly. Moreover, the method includes obstructing the fluid from exiting at least some of the one or more channels during rotation of one or more of the first bearing assembly or the second bearing assembly.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments of the invention are directed to bearing assemblies, bearing apparatuses, and methods of operation thereof. In particular, embodiments include bearing assemblies configured to promote maintaining a fluid at or near bearing surfaces thereof. For example, one or more bearing assemblies of a bearing apparatus may include a fluid retention mechanism that may facilitate fluid retention at, near, or adjacent to the bearing surfaces. Such fluid may provide a fluid film between bearing surfaces of opposing bearing assemblies of the bearing apparatus. Maintaining a fluid film between opposing bearing surfaces may facilitate hydrodynamic operation of the bearing apparatus.

In some embodiments, one or more bearing assemblies of the bearing apparatus may be configured to limit, obstruct, or prevent flow of fluid away from bearing elements and/or bearing surfaces of the bearing assembly in response to centrifugal forces experienced thereby. For instance, rotation of the bearing assembly may produce a corresponding rotation of the fluid (e.g., of the fluid that is in contact with the bearing assembly). Such rotation may exert centrifugal forces on the fluid, urging the fluid radially away from the center of rotation of the bearing assembly. As noted above, however, in an embodiment, the bearing assembly may be configured to impede or prevent flow of the fluid away from the bearing elements and/or bearing surfaces of the bearing assembly. That is, the bearing assembly may include the fluid retention mechanism that may facilitate hydrodynamic operation of the bearing apparatus.

Figure 1:
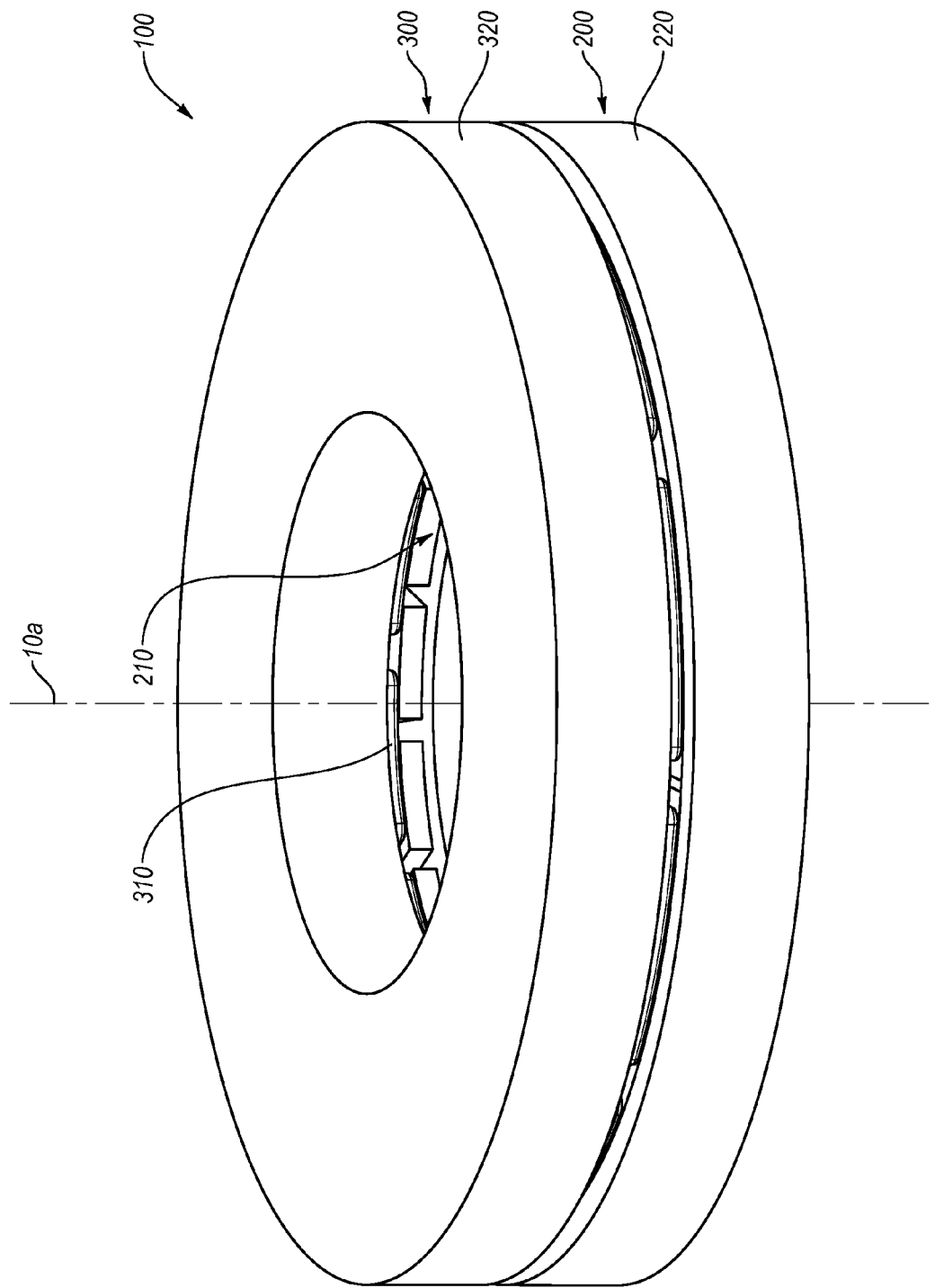
FIG. 1 is an isometric view of a thrust-bearing apparatus according to an embodiment.

Some embodiments include thrust-bearing assemblies and apparatuses. FIG. 1 illustrates an embodiment of a thrust-bearing apparatus 100, which may include first and second thrust-bearing assemblies 200, 300. The first thrust-bearing assembly 200 may be a rotor, while the second thrust-bearing assembly 300 may be a stator, or vice versa. Additionally or alternatively, both the first and second thrust-bearing assemblies 200 and 300 may be rotors (i.e., both the first and second thrust-bearing assemblies 200, 300 may rotate about center axes thereof).

Each of the first thrust-bearing assembly 200 and the second thrust-bearing assembly 300 may include multiple generally opposing bearing elements, such as bearing elements 210, 310 the bearing surfaces of which face and engage one another, and which may be mounted in or on respective support rings 220, 320. As described below in further detail, in some embodiments, the bearing elements may be superhard bearing elements and may include corresponding superhard bearing surfaces that may engage one another during operation of the thrust-bearing apparatus 100.

In some embodiments, the bearing elements 210, 310 may engage each other in a manner that prevents or limits relative axial movement of the first thrust-bearing assembly 200 and the second thrust-bearing assembly 300 (e.g., the bearing elements 210 may contact the bearing elements 310 and may prevent relative movement of the first and second thrust-bearing assemblies 200, 300 along an axis 10a). Moreover, while the first thrust-bearing assembly 200 and the second thrust-bearing assembly 300 may be restricted or limited from relative axial movement, the first and second thrust-bearing assemblies 200 and 300 may move laterally and/or rotationally relative to each other. Accordingly, connecting or securing the first thrust-bearing assembly 200 and the second thrust-bearing assembly 300 to movable machine components may allow such components to move laterally or radially relative to each other, while limiting or preventing relative axial movement thereof.

The particular configuration of the first and/or second thrust-bearing assemblies 200, 300 may vary from one embodiment to the next. Moreover, in some instances, the first thrust-bearing assembly 200 or the second thrust-bearing assembly 300 of the bearing apparatus 100 may engage a bearing surface that is incorporated into or forms a part of a moving or movable machine component. In any event, the thrust-bearing apparatus 100 may facilitate relative rotation of machine elements or components under axial forces of thousands or even tens of thousands of pounds.

Figure 2A:
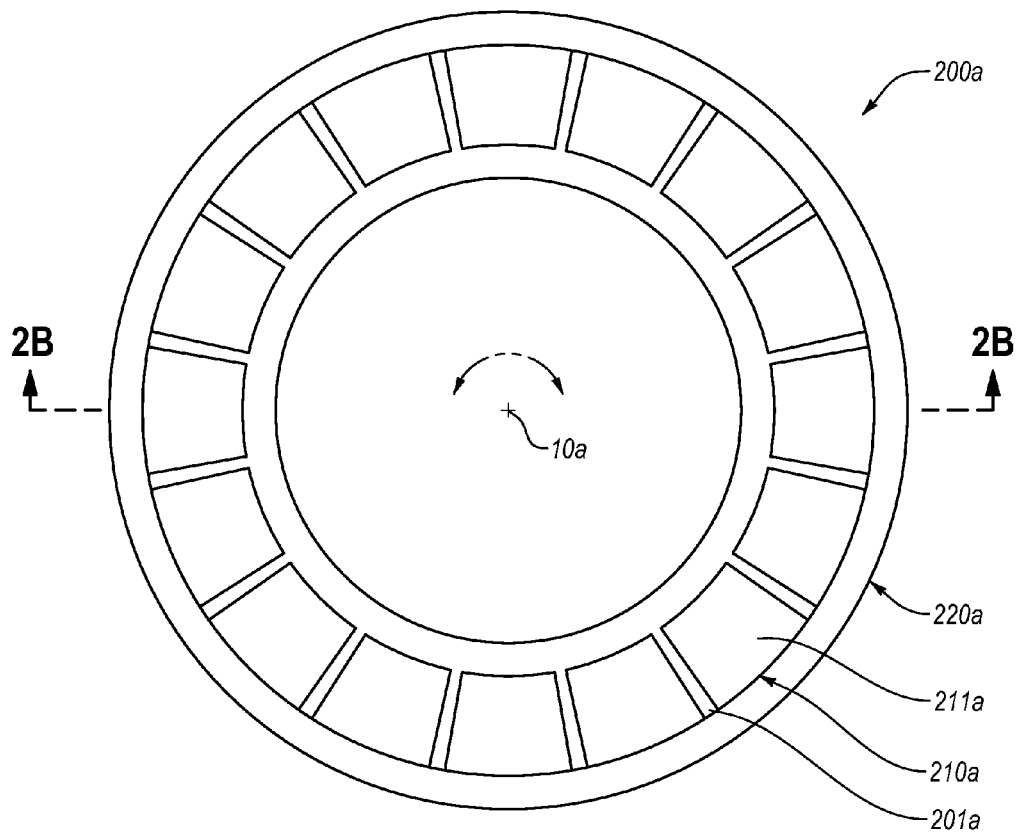
FIG. 2A is a top view of a thrust-bearing assembly according to an embodiment.
Figure 2B:
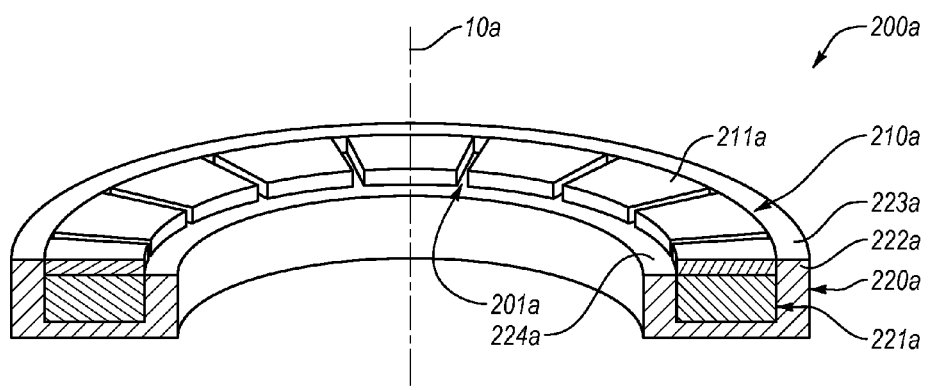
FIG. 2B is an isometric, cross-sectional view of the thrust-bearing assembly of FIG. 2A.

As mentioned above, any of the bearing assemblies may be configured to retain fluid near the bearing elements and/or near or on the bearing surfaces thereof. For ease of description, reference will be made to a single bearing assembly, such as to a first thrust-bearing assembly or to a second thrust-bearing assembly. It should be appreciated that any of the bearing assemblies described herein and combinations thereof may be included in a bearing apparatus. FIGS. 2A and 2B illustrate a first thrust-bearing assembly 200a. Except as otherwise described herein, the first thrust-bearing assembly 200a and its materials, elements, features, or components may be similar to or the same as any of the first thrust-bearing assembly 200 or the second thrust-bearing assembly 300 (FIG. 1) and their respective materials, elements, features, and components.

In some embodiments, as shown in FIG. 2A, the first thrust-bearing assembly 200a may include superhard bearing elements 210a secured to a support ring 220a. Also, as described below in further detail, the superhard bearing elements 210a may include one or more bearing surfaces 211a that may engage one or more bearing surface(s) of an opposing bearing assembly and/or machine element or component. In some embodiments, the bearing surfaces 211a may be approximately planar. Additionally or alternatively, the bearing surfaces may include recesses, grooves, dimples, indentations, or combinations thereof, which may facilitate fluid retention thereon. In any case, the bearing surfaces of the superhard bearing elements may have any suitable configuration that may allow the bearing surfaces to carry a thrust load during operation.

Generally, the superhard bearing elements 210a may have any number of suitable arrangements on the support ring 220a, which may vary from one embodiment to another. For instance, the superhard bearing elements 210a may be circumferentially positioned about an axis of rotation, such as axis 10a. In an embodiment, the superhard bearing elements 210a may be arranged in a single circumferential row about the support ring support ring 220a. In additional or alternative embodiments, the superhard bearing elements may be distributed in two circumferential rows, three circumferential rows, four circumferential rows, or any other number of circumferential rows.

Also, in some instances, the superhard bearing elements 210a may be spaced apart one from another. For example, the first thrust-bearing assembly 200a may include gaps, voids, or channels between adjacent superhard bearing elements 210a, such as channels 201a. It should be appreciated that the term "channel," as used herein to describe space between immediately adjacent bearing elements, which is formed by separation therebetween, is intended to encompass any space that separates (e.g., circumferentially separates) adjacent bearing elements, including but not limited to voids, gaps, cavities, and the like. For example, at least one of, some of, or all of the gaps channels may exhibit a width of about 0.005 mm to about 2.5 mm, such as about 0.01 mm to about 0.02 mm, about 0.01 mm to about 2 mm, or about 0.1 mm to about 1 mm.

In some embodiments, fluid may be located in one, some, or all of the channels 201a. For instance, cooling and/or lubricating fluid (e.g., drilling fluid) may flow into and/or may be pumped or otherwise forced into the first thrust-bearing assembly 200a in a manner that such fluid enters the channels 201a such as radially inwardly from the outside of the thrust-bearing apparatus 100. Additionally or alternatively, the bearing elements may be shaped or configured to draw fluid into the channels therebetween. For example, the bearing elements may be shaped in a manner that forms a general shape of an impeller, which may draw fluid from the surrounding environment into the channels between the bearing elements.

Moreover, the fluid may flow or may be available to one or more of the bearing surfaces 211a. In an embodiment, the fluid may occupy the channels 201a and be available to the bearing surfaces 211a. As described below in further detail, in some instances, the superhard bearing elements may include one or more features that may facilitate fluid flow from the channel to the bearing surface(s) of the bearing element(s).

Furthermore, in some embodiments, the fluid may form a film on one or more of bearing surfaces 211a during operation of the first thrust-bearing assembly 200a. In particular, such film may facilitate hydrodynamic operation of the first thrust-bearing assembly 200a and of a bearing apparatus that includes the first thrust-bearing assembly 200a. In some instances, the fluid may be continuously provided to the bearing surfaces 211a, thereby continuously providing a fluid film that may separate and/or provide lubrication between the bearing surfaces 211a and opposing bearing surface(s) of another bearing assembly.

Generally, the superhard bearing elements 210a may be secured to the support ring 220a in any number of suitable ways that may vary from one embodiment to the next. For instance, as shown in FIG. 2B, the support ring 220a may include one or more recesses, such as recesses 221a, within which at least a portion of the superhard bearing elements 210a may be located and/or secured to the support ring 220a. According to various embodiments, the superhard bearing elements 210a may be at least partially secured within recesses 221a in the support ring support ring 220a by brazing, press-fitting, threadedly attaching, fastening with a fastener, combinations of the foregoing, or another suitable technique.

In additional or alternative embodiments, the first thrust-bearing assembly 200a may include a fluid retention feature that may be secured to or integrated with the support ring 220a and/or with the superhard bearing elements 210a. For example, the first thrust-bearing assembly 200a may include a barrier element 222a integrally formed with the support ring 220a. In additional or alternative embodiments, the barrier element 222a may be separately formed and secured to the support ring 220a (e.g., the barrier element 222a may be fastened, welded, brazed, or otherwise secured to the support ring 220a). In any event, in an embodiment, the barrier element 222a may facilitate at least partial fluid retention within the channels 201a. For instance, the barrier element 222a may prevent or limit fluid flow through the channels 201a as the first thrust-bearing assembly 200a rotates about the axis 10a.

In an embodiment, the barrier element 222a may extend completely about the circumference of the support ring 220a. For instance, the barrier element 222a may uninterruptedly or continuously encompass the circumference the support ring 220a of the first thrust-bearing assembly 200a. In alternative or additional embodiments, the barrier element 222a may have one or more interruptions, joints, gaps, or breaks therein. Moreover, as described below in further detail, bearing assemblies may include multiple barrier elements that may block one or more of the channels between the bearing elements. Also, in some examples, barrier element(s) may span only a portion of the circumference. In any event, a single barrier element or multiple barrier elements may at least partially block one, some, or all of the channels 201a.

Notably, restricting flow through the channels 201a may facilitate fluid flow to the bearing surfaces 211a of the superhard bearing elements 210a. In an embodiment, the fluid may be captured and/or forced between the bearing surfaces 211a and the opposing bearing surface(s) by forcing and/or capturing the fluid within channels 201a. Accordingly, some embodiments, the barrier element 222a may facilitate hydrodynamic operation of a bearing apparatus that includes the first thrust-bearing assembly 200a.

In some embodiments, the barrier element 222a may include a top surface 223a that may form an uppermost surface or side of the support ring 220a. Moreover, top surface 223a may be approximately in the same plane or coplanar with at least some of the bearing surfaces 211a. Accordingly, in an embodiment, the barrier element 222a may close the radially outermost openings of the channels 201a. In other words, the radially outermost openings of the channels 201a may be substantially closed off or substantially sealed by the barrier element 222a.

Conversely, in some embodiments, the support ring 220a may include an inner top surface 224a, such that interior or radially inward openings of one, some, or all of the channels 201a may remain at least partially unobstructed. For instance, the inner top surface 224a may be below one, some, or all of the bearing surfaces 211a. That is, at least some of the superhard bearing elements 210a may extend above the inner top surface 224a in a manner that maintains at least some of the channels 201a unobstructed on the interior or radially inward openings thereof. As such, the fluid may flow into the channels 201a from the radially inward openings thereof. Moreover, as described above, fluid flow may be at least partially obstructed or blocked on the radially outermost openings of the channels 201a, which may facilitate flow of the fluid to the bearing surfaces 211a of the superhard bearing elements 210a.

Figure 3A:
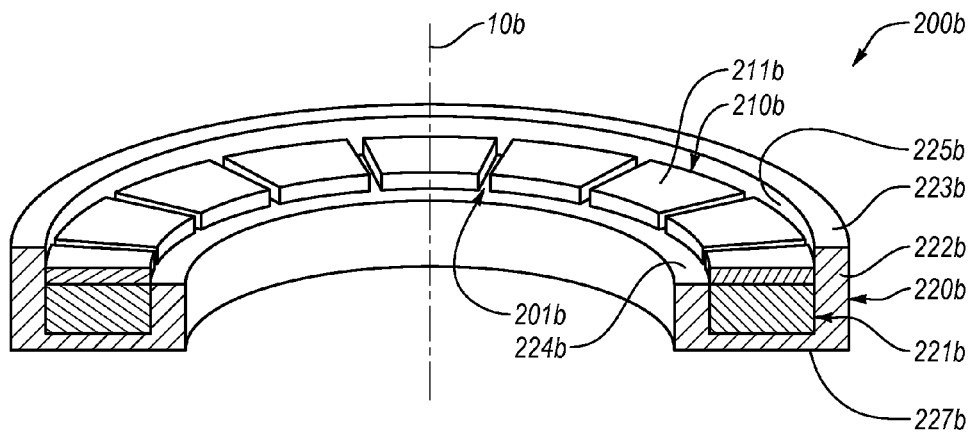
FIG. 3A is an isometric, cross-sectional view of a thrust-bearing assembly according to an embodiment.

While in some instances, the barrier element 222a may have the top surface 223a that is approximately coplanar with the bearing surfaces 211a of the superhard bearing elements 210a, embodiments of the invention are not so limited. For example, the top surface 223a of the barrier elements 222a may be above or below the bearing surfaces 211a of the bearing elements 210a. FIG. 3A illustrates an embodiment of a first thrust-bearing assembly 200b that includes superhard bearing elements 210b secured to a support ring 220b. Except as otherwise described herein, the first thrust-bearing assembly 200b and its materials, elements, features, or components may be similar to or the same as any of the first thrust-bearing assemblies 200, 200a or the second thrust-bearing assembly 300 (FIGS. 1-2B) and their respective materials, elements, features, and components. For example, similar to the first thrust-bearing assembly 200a (FIGS. 2A-2B), the support ring 220b of the first thrust-bearing assembly 200b may include a recess 221b to which the superhard bearing elements 210b may be secured.

The first thrust-bearing assembly 200b also may include a barrier element 222b that may restrict or block fluid flow through at least some channels 201b, which may be located between the superhard bearing elements 210b. In addition, the barrier element 222b may include a top surface 223b that may be non-coplanar with bearing surfaces 211b of the superhard bearing elements 210b. For example, the top surface 223b may extend or protrude below or beyond the bearing surfaces 211b. In an embodiment, the barrier element 222b may have a top surface 223b with a height that is greater than the height (as measured from bottom surface 227b) of the superhard bearing elements 210b such that the top surface 223b protrudes above (as measured from the bottom surface 227b) an inner top surface 224b of the support ring 220b. As such, the barrier element 222b may limit or prevent fluid, including fluid film, located on the bearing surfaces 211b from flowing away from a center of rotation of the first thrust-bearing assembly 200b (e.g., axis 10b) and off the bearing surfaces 211b. In any event, the barrier element 222b may facilitate maintaining or developing a fluid film on and between the bearing surfaces 211b and opposing bearing surface(s) during operation of the first thrust-bearing assembly 200b.

Figure 3B:
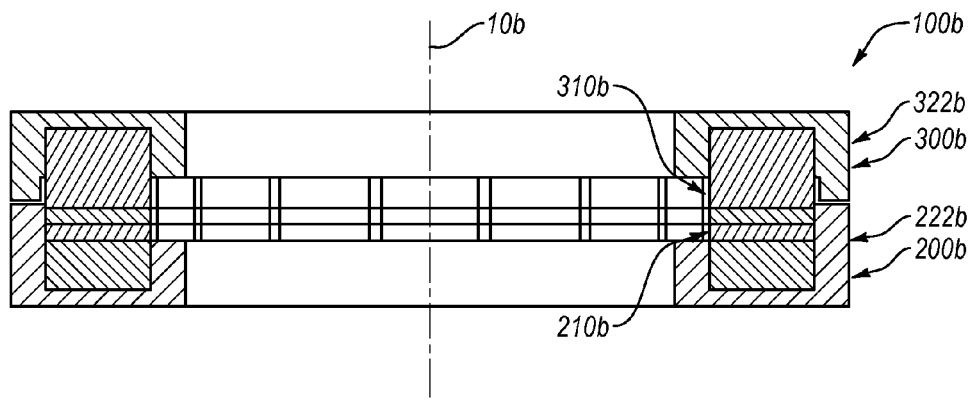
FIG. 3B is a cross-sectional view of a thrust-bearing apparatus including the thrust-bearing assembly of FIG. 3A according to an embodiment.

FIG. 3B illustrates a thrust-bearing apparatus 100b that include the thrust-bearing assembly 200b and an opposing thrust-bearing assembly 300b. In some embodiments, the opposing thrust-bearing assembly 300b also may include one or more barrier elements 322b, which may be similar to or the same as the barrier elements 222b. Moreover, in some embodiments, the thrust-bearing assembly 300b may be similar to or the same as the thrust-bearing assembly 200b. Optionally, under operating conditions, the thrust-bearing apparatus 100b may include a gap or a space between the barrier elements 222b of the thrust-bearing assembly 200b and barrier elements 322b of the thrust-bearing assembly 300b. In other words, during operation of the thrust-bearing apparatus 100b, the respective top surfaces of the barrier elements 222b and 322b may be spaced apart from one another. Alternatively, at least some of the barrier elements 222b and 322b may touch or contact one another (i.e., during operation of the bearing apparatus 100b, at least some of the top surfaces of the respective barrier elements 222b and 322b may contact one another).

In an embodiment, the barrier elements 222b may abut the superhard bearing elements 210b of the thrust-bearing assembly 200b. That is, there may be no gap or a small gap between the barrier element 222b and corresponding superhard bearing elements 210b that define the channel blocked or obstructed by the barrier element 222b. Alternatively or additionally, barrier elements may be spaced apart from the superhard bearing elements. For instance, as shown in FIG. 3B, at least one barrier element 322b of the thrust-bearing apparatus 300b may be spaced from corresponding superhard bearing elements 310b that form the channel blocked or obstructed by the barrier element 322b.

Figure 3C:
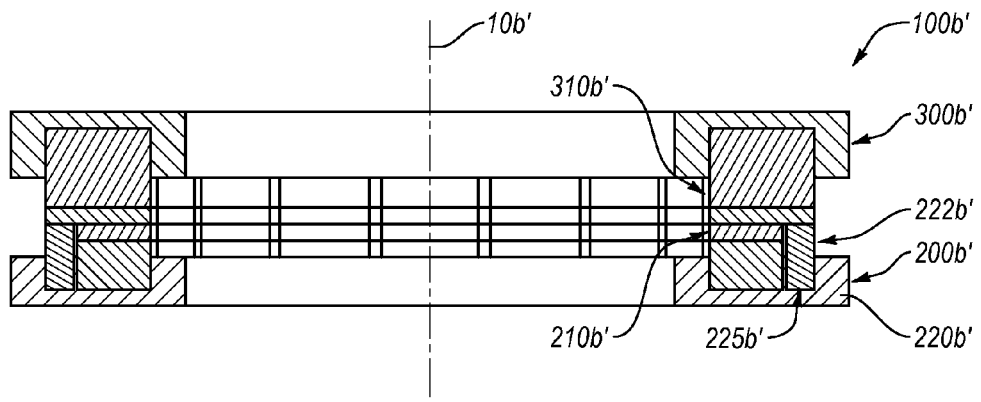
FIG. 3C is a cross-sectional view of a thrust-bearing apparatus according to another embodiment.

In an embodiment, the bearing surfaces of corresponding superhard bearing elements of opposing thrust-bearing assemblies may have the same area or size. FIG. 3C, a thrust-bearing apparatus 100b' includes a thrust-bearing apparatus 200b' and an opposing thrust-bearing apparatus 300b'. In some embodiments, the thrust-bearing apparatus 200b' may include superhard bearing elements 210b' at least some of which that may have smaller bearing surfaces as compared to bearing surfaces of at least some of bearing elements 310b' of the thrust-bearing assembly 300b'.

Moreover, in some embodiments, top surfaces of at least some barrier elements 222b' of the thrust-bearing assembly 200b' may overlap with the bearing surfaces of the bearing elements 310b' of the thrust-bearing assembly 300b'. In other words, during operation of the thrust-bearing apparatus 100b', the top surfaces of at least some of the barrier elements 222b' of the thrust-bearing assembly 200b' may pass over or under the bearing surface of the superhard bearing elements 310b' of the opposing thrust-bearing assembly 300b' (as the thrust-bearing assemblies 200b' and 300b' rotate relative to each other).

Furthermore, in some embodiments, the barrier elements 222b may be secured to a support ring 220b' of the thrust-bearing assembly 200b' (in lieu of or in addition to incorporating barrier elements into the support ring). For example, the support ring 220b' may include one or more recesses 225b' that may accommodate the barrier elements 222b'. The barrier elements 222b' may be secured within and/or by the corresponding recesses 225b' to the support ring 220b' by brazing, press-fitting, threadedly attaching, fastening with a fastener, combinations of the foregoing, or another suitable technique. In some embodiments, the barrier elements 222b' may comprise a superhard material that is made from any of the superhard materials disclosed herein for the disclosed bearing elements. For example, the barrier elements 222b' may comprise polycrystalline diamond, such as a polycrystalline diamond body or a polycrystalline diamond compact including a substrate bonded to a polycrystalline diamond table, with the polycrystalline diamond table positioned to generally oppose the bearing element 310b'.

Figure 4A:
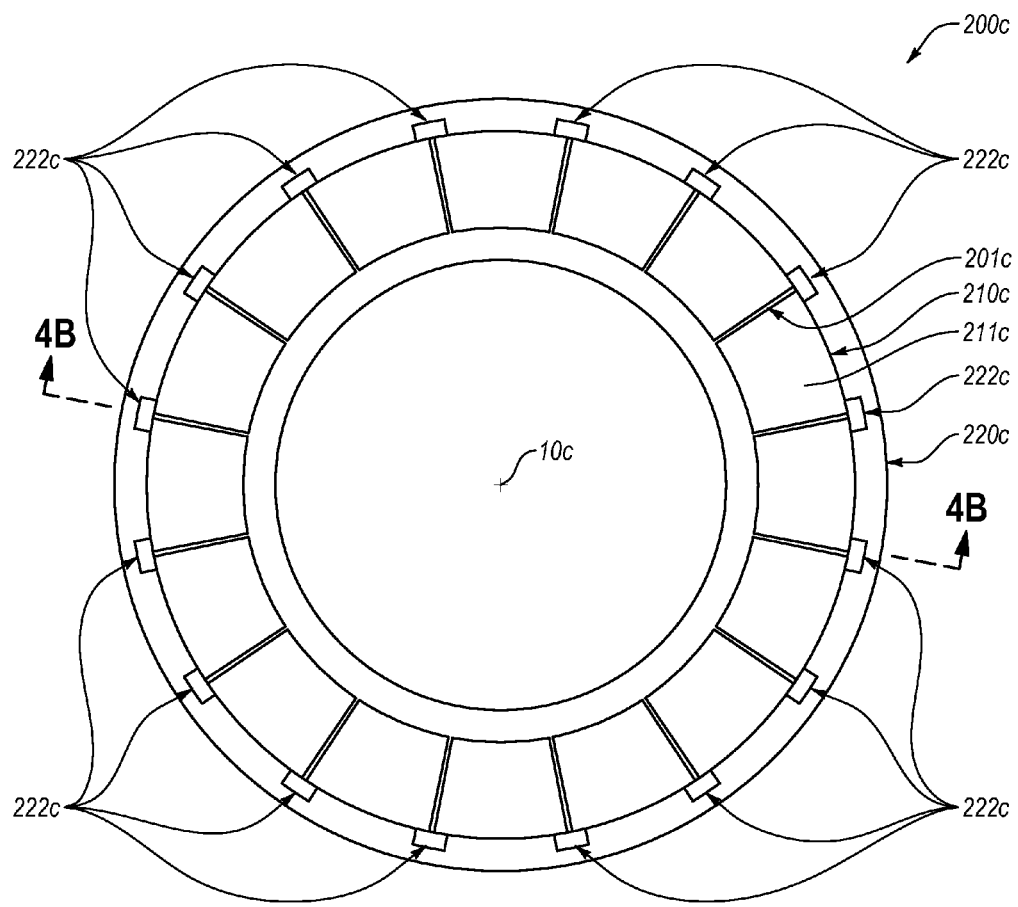
FIG. 4A is a top view of a thrust-bearing assembly according to an embodiment.
Figure 4B:
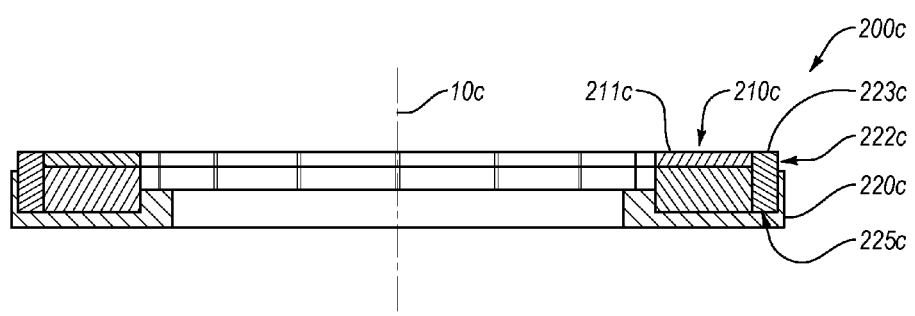
FIG. 4B is a cross-sectional view of the thrust-bearing assembly of FIG. 4A.

While in some embodiments that barrier element may be continuous, in alternative or additional embodiments, the bearing assembly may include an interrupted barrier elements and/or multiple barrier elements, each of which may at least partially block or obstruct one or more channels between the bearing elements. FIGS. 4A-4B, for example, illustrates an embodiment of a first thrust-bearing assembly 200c that includes multiple barrier elements. Except as otherwise described herein, the first thrust-bearing assembly 200c and its materials, elements, features, or components may be similar to or the same as any of the first thrust-bearing assemblies 200, 200a, 200b, 200b', 300b, 300b' or the second thrust-bearing assembly 300 (FIGS. 1-3C) and their respective materials, elements, features, and components. As shown in FIG. 4A, in some embodiments, the first thrust-bearing assembly 200c may include superhard bearing elements 210c secured to a support ring 220c and multiple barrier elements 222c obstructing or blocking channels 201c.

Furthermore, in some embodiments, the barrier elements 222c may be integrated with the support ring 220c, while in other embodiments, the barrier elements 222c may be attached to or mounted on the support ring 220c. Also, in some embodiments, the barrier elements 222c may comprise the same or similar material as the support ring 220c. For example, the support ring 220c and/or the barrier elements 222c may comprise or include steel. It should be appreciated that any of the barrier elements 222c may include any suitable material, which may vary from one embodiment to the next. Furthermore, suitable materials include metallic and nonmetallic material. More specifically, examples of suitable materials include, but are not limited to, steel, aluminum, copper, plastic, rubber, silicone, tungsten carbide, combinations thereof, a polycrystalline diamond compact (described below in more detail), without limitation. In yet further embodiments, barrier elements may be bearing elements, such as superhard bearing elements.

In some embodiments, at least a portion of one, some, or all of the barrier elements 222c may be located within the corresponding channel 201c. Additionally, however, at least a portion of the channel 201c that includes the barrier element 222c may be unobstructed, such that fluid may enter the channels 201c (e.g., a radially inward opening thereof) and flow toward the barrier element 222c as well as upward, toward bearing surfaces 211c during rotation of the first thrust-bearing assembly 200c. In other words, while a portion of at least one of the barrier element 222c may be inside (e.g., at least partially circumferentially between circumferentially adjacent elements) the corresponding at least one channel 201c, a portion or opening of such channel 201c may remain unobstructed by the barrier element 222c.

Also, it should be appreciated that in some embodiments, the bearing surfaces opposing and engaging the bearing surfaces 211c may contact, rub, and wear the barrier elements 222c. In some embodiments, the barrier elements 222c may wear as the bearing surfaces 211c wear (e.g., barrier elements 222c and bearing surfaces 211c may be substantially coplanar). Alternatively, the barrier elements 222c may not wear as the bearing surfaces and/or bearing elements opposing the bearing surfaces 211c wear against one another. For instance, the bearing surfaces and/or bearing elements of a bearing assembly opposing the first thrust-bearing assembly 200c may be inwardly offset from the barrier elements 222c in a manner that avoids or limits contact with the barrier elements 222c (e.g., an imaginary circumference circumscribing the bearing surfaces opposing the bearing surfaces 211c may be smaller than imaginary circumference about which the barrier elements 222c lie). In any event, in one or more embodiments, the barrier elements 222c may at least partially block, restrict, or obstruct fluid flow through the channels 201c during initial operation of the first thrust-bearing assembly 200c as well as after the wear of at least a portion of the bearing surfaces 211c.

As shown in FIG. 4B, in some examples, the barrier elements 222c may be attached to the support ring 220c. For instance, at least some of the barrier elements 222c may be secured within corresponding recesses 225c in the support ring 220c. In an embodiment, corresponding top surfaces 223c of some or all of the barrier elements 222c may be approximately coplanar with at least some of the bearing surfaces 211c of the superhard bearing elements 210c. Alternatively, however, the top surfaces 223c of the barrier elements 222c may lie in one or more different planes than the bearing surfaces 211c.

In some embodiments, only part of the superhard bearing elements 210c may protrude beyond the support ring 220c. For example, only the superhard table of the superhard bearing elements 210c may protrude out of the support ring 220c. For instance, portion(s) of the superhard bearing elements 210a that contain diamond (e.g., polycrystalline diamond) may protrude or may extend beyond to surface of the support ring 220c. Optionally, in some instances, the barrier elements 222c may be bonded to such exposed diamond and/or the underlying substrate if exposed. Suitable materials for the barrier elements 222c may include brazing materials (e.g., active carbide-forming brazes, Silver solder), epoxy, chemical vapor deposited ("CVD") or physical vapor deposited ("PVD") coatings (e.g., CVD deposited diamond), combinations thereof, or any suitable material. Also, in some embodiments, a material included in the barrier elements 222c may be attached or bonded to the diamond portions of the superhard bearing elements 210c using suitable techniques, such as brazing.

Figure 5:
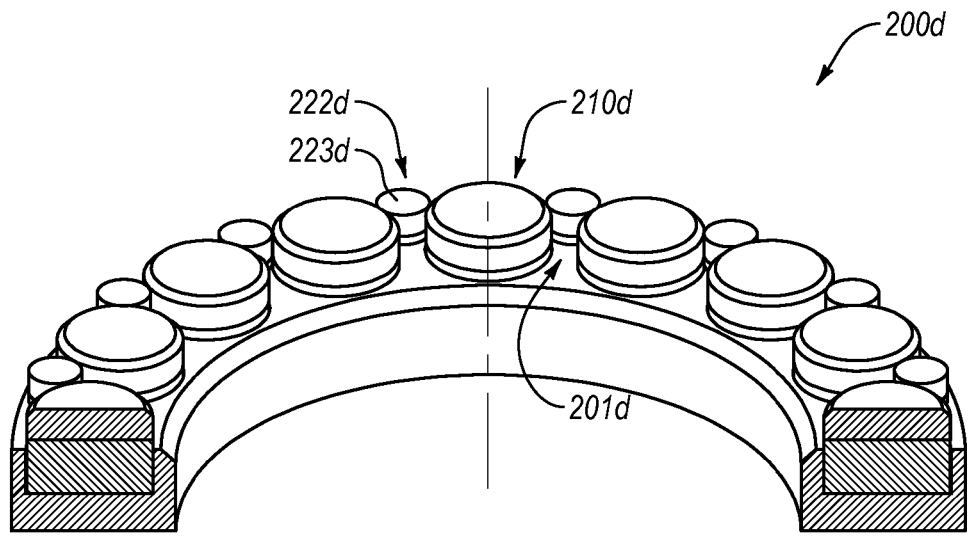
FIG. 5 is an isometric, cross-sectional view of a thrust-bearing assembly according to another embodiment.

As shown in FIG. 5, in some embodiments, a thrust-bearing assembly 200d may include approximately cylindrical superhard bearing elements 210d spaced apart from one another and forming or defining channels 201d therebetween. Except as otherwise described herein, the first thrust-bearing assembly 200d and its materials, elements, features, or components may be similar to or the same as any of the first thrust-bearing assemblies 200, 200a, 200b, 200b', 300b, 300b', 200c or the second thrust-bearing assembly 300 (FIGS. 1-4B) and their respective materials, elements, features, and components. For example, the thrust-bearing assembly 200d may include barrier elements 222d that may block or obstruct the channels 201d between the bearing elements 210d.

In some embodiments, the barrier elements 222d may include a superhard table bonded to a substrate. Moreover, the superhard table may define bearing surfaces 223d of barrier elements 222d. In an embodiment, the bearing surfaces 223d of the barrier elements 222d may be approximately coplanar with bearing surfaces 211d of the superhard bearing elements 210d.

In an embodiment, the barrier elements 222d may be approximately cylindrical. Alternatively, the barrier elements may have any number of suitable shapes that may vary from one embodiment to the next. Furthermore, the barrier elements 222d may abut approximately cylindrical superhard bearing elements 210d. That is, the barrier elements 222d may substantially completely block corresponding channels 201d.

Figure 6:
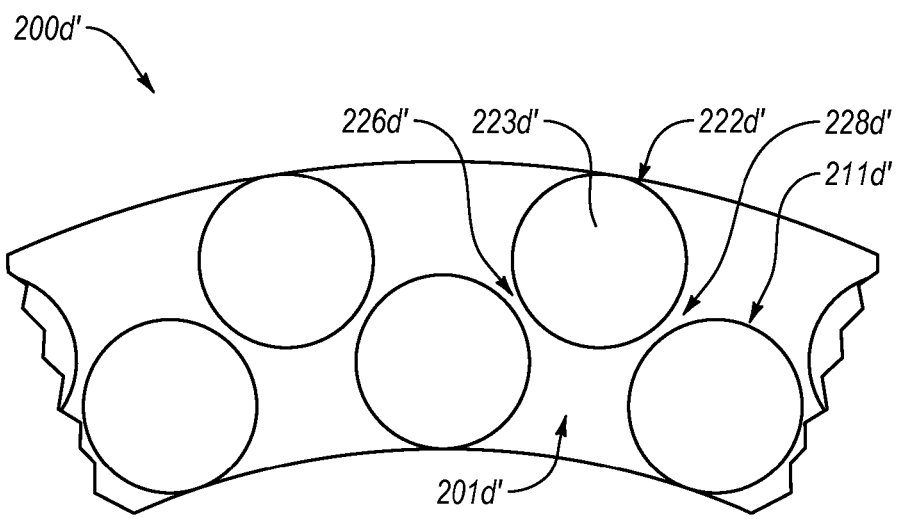
FIG. 6 is an isometric, cross-sectional view of a thrust-bearing assembly according to yet another embodiment.

Alternatively, as shown in FIG. 6, barrier elements 222d', of a thrust-bearing assembly 200d', may be spaced apart from corresponding superhard bearing elements 210d' that form a channel 201d' therebetween. Except as otherwise described herein, the first thrust-bearing assembly 200d' and its materials, elements, features, or components may be similar to or the same as any of the first thrust-bearing assemblies 200, 200a, 200b, 200b', 300b, 300b', 200c, 200d or the second thrust-bearing assembly 300 (FIGS. 1-5) and their respective materials, elements, features, and components. In an embodiment, the barrier elements 222d' may only partially block or obstruct corresponding channels 201d'. That is, for instance, at least some fluid may pass through gaps 226d', 228d' between the barrier elements 222d' and corresponding or adjoining superhard bearing elements 210d'.

In an embodiment, the barrier elements 222d' may be the same as or similar to the superhard bearing elements 210d'. For example, the barrier elements 222d' may include superhard bearing surfaces 223d' that may have approximately the same shape and/or size as bearing surfaces 211d' of the superhard bearing elements 210d'. Accordingly, the barrier elements 222d' and the superhard bearing elements 210d' may collectively carry the load experienced by the thrust-bearing assembly 200d'.

Figure 7:
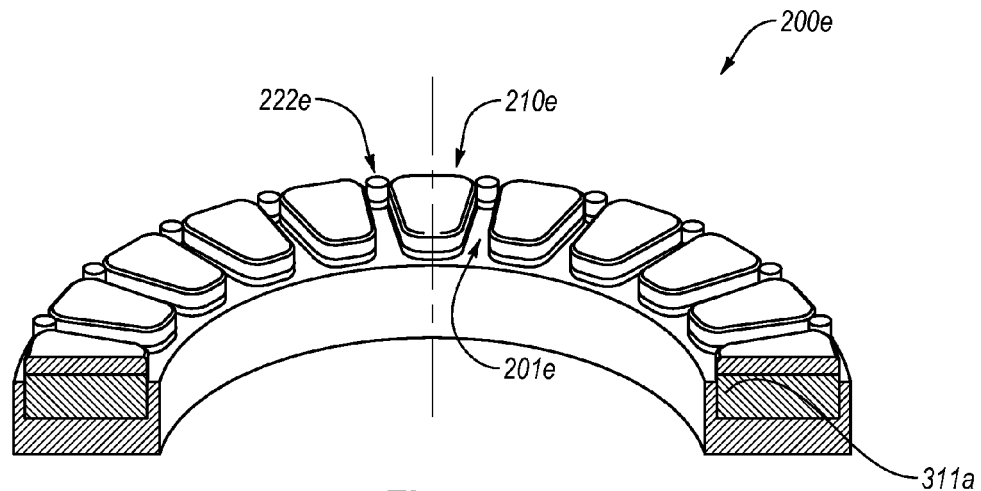
FIG. 7 is a partial, top view of a thrust-bearing assembly according to still another embodiment.

FIG. 7 illustrates a thrust-bearing assembly 200e that include approximately trapezoidal superhard bearing elements 210e spaced apart from one another and approximately cylindrical barrier elements 222e. Except as otherwise described herein, the first thrust-bearing assembly 200e and its materials, elements, features, or components may be similar to or the same as any of the first thrust-bearing assemblies 200, 200a, 200b, 200b', 300b, 300b', 200c, 200d, 200d' or the second thrust-bearing assembly 300 (FIGS. 1-6) and their respective materials, elements, features, and components. For example, the barrier elements 222e may be similar to or the same as the barrier elements 222d (FIG. 5)—i.e., the barrier elements 222e may have a substantially cylindrical shape.

The barrier elements 222e may block or obstruct one or more channels 201e between adjacent ones of the superhard bearing elements 210e. In some embodiments, the channels 201e may be tapered. For example, radially inward facing openings of the channels 201e may be wider than the radially outward facing openings thereof. In an embodiment, the barrier elements 222e may be positioned at the narrower openings of the tapered channels 201e, thereby blocking or obstructing fluid flow through the channels 201e.

It should be appreciated that, as described above, shapes, size, configuration, or combinations thereof of the barrier elements may vary from one embodiment to the next. Furthermore, in some embodiments, the barrier elements may be similar to or the same as the superhard bearing elements and/or may carry at least some of the load experienced by the thrust-bearing assembly. Moreover, the thrust-bearing assembly may include any number of superhard bearing elements that may have any number of suitable shapes, size, configurations, or combinations thereof, and which may vary from one embodiment to the next. For instance, the superhard bearing elements disclosed herein may include one or more ramped surfaces, as described in more detail in U.S. application. Ser. No. 13/213,382, entitled "Bearing Assemblies, Apparatuses, And Motor Assemblies Using The Same," filed on Aug. 19, 2011, the entire disclosure of which is incorporated herein by this reference. For example, when the gaps between adjacent bearing elements are relatively wide, a ramp feature on the bearing elements may help promote flow of fluid toward the bearing surfaces of the bearing elements.

Figure 8:
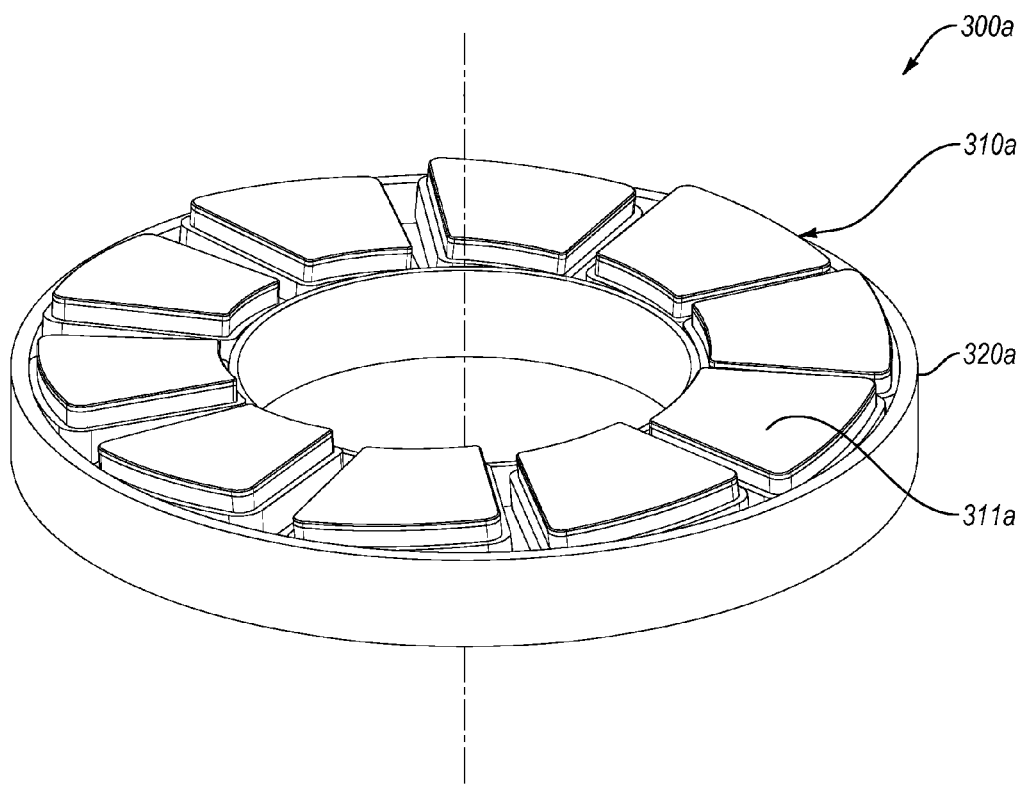
FIG. 8 is an isometric view of a thrust-bearing assembly according to still one other embodiment.

While in some embodiments a bearing apparatus may include two opposing bearing assemblies that have barrier elements, embodiments of the invention are not so limited. As noted above, for instance, a bearing apparatus may include one bearing assembly with the barrier element and an opposing bearing assembly that does not include barrier elements. Moreover, in some instances, the bearing apparatus may include at least one bearing assembly that has tilting or tiltable bearing elements. FIG. 8 illustrates an embodiment of a second thrust-bearing assembly 300a that has tiltable superhard bearing elements 310a secured to a support ring 320a. Except as otherwise described herein, the second thrust-bearing assembly 300a and its materials, elements, features, or components may be similar to or the same as any of the first thrust-bearing assemblies 200, 200a, 200b, 200b', 300b, 300b', 200c, 200d, 200d', 200e or the second thrust-bearing assembly 300 (FIGS. 1-7) and their respective materials, elements, features, and components.

In an embodiment, the superhard bearing elements 310a may be tiltable relative to the support ring 320a (e.g., during operation of the second thrust-bearing assembly 300a). Particularly, the superhard bearing elements 310a may include working surfaces 311a that may be tilted relative to the support ring 320a and/or relative to one another, as described in more detail in U.S. patent application Ser. No. 13/550,831, entitled "Tilting Superhard Bearing Elements in Bearing Assemblies, Apparatuses, and Motor Assemblies Using the Same, filed Jul. 17, 2012, the entire disclosure of which is incorporated herein by this reference. Tilting the bearing surfaces 311a of the second thrust-bearing assembly 300a may facilitate improved contact between the second thrust-bearing assembly 300a and the bearing surfaces of the first bearing assembly (as compared with the bearing surfaces that are not tiltable). Further, in some embodiments, tiltable superhard bearing elements 310a may facilitate hydrodynamic operation of the bearing apparatus. Typically, the second thrust-bearing assembly 300a is the stator, but in other embodiments, the second thrust-bearing assembly 300a may be the rotor.

Figure 9:
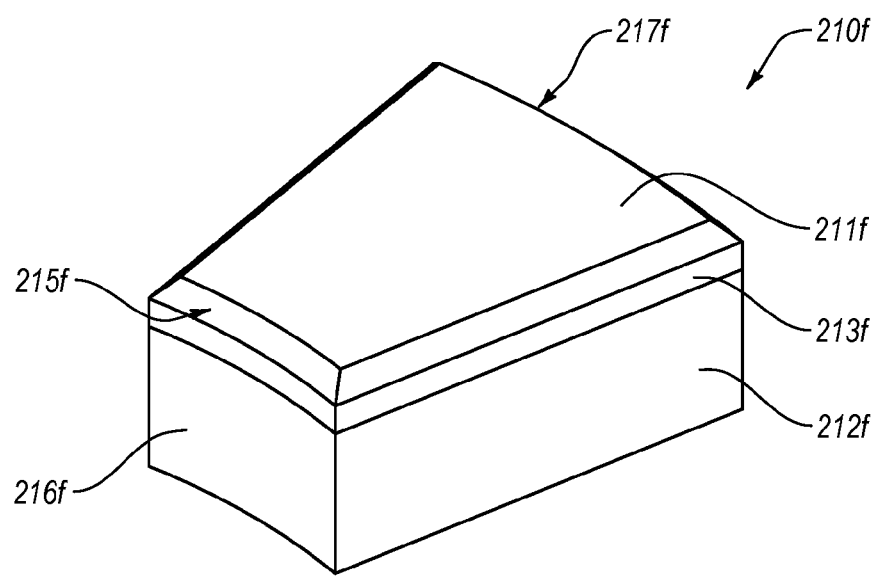
FIG. 9 is an isometric view of a bearing element according to an embodiment.

It should be appreciated that shapes and/or sizes of the bearing elements may vary from one embodiment to the next. Hence, while some examples of bearing elements are described herein, this disclosure is not limited to such examples. Moreover, any of the bearing elements described herein may be included in any of the bearing assemblies. FIG. 9, for example, illustrates an embodiment of a superhard bearing surface 211f that has an approximately trapezoidal shape. For example, the superhard bearing element 210f may include a substrate 212f and a superhard table 213f bonded or otherwise secured to the substrate 212f, and the superhard table 213f may include the superhard bearing surface 211f.

In some embodiments, the superhard table 213f may comprise polycrystalline diamond and the substrate 212f may comprise cobalt-cemented tungsten carbide. For example, the polycrystalline diamond table may comprise a plurality of bonded together diamond grains exhibiting diamond-to-diamond therebetween (e.g., $sp^3$ bonding) defining interstitial regions that may include a catalyst material therein. Other carbide materials may be used with tungsten carbide or as an alternative, such as chromium carbide, tantalum carbide, vanadium carbide, titanium carbide, or combinations thereof cemented with iron, nickel, cobalt, or alloys thereof. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table 150a in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 70 μm, 60 μm, 50 μm, 40 μm, 30 μm, 20 μm, 15 μm, 12 μm, 10 μm, 8 μm) and another portion exhibiting at least one relatively smaller size (e.g., 15 μm, 12 μm, 10 μm, 8 μm, 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In another embodiment, the diamond particles may include a portion exhibiting the relatively larger size between about 15 μm and about 50 μm and another portion exhibiting the relatively smaller size between about 5 μm and about 15 μm. In another embodiment, the relatively larger size diamond particles may have a ratio to the relatively smaller size diamond particles of at least 1.5 for the ratio of the average size of the larger size diamond particles to the average size of the smaller size diamond particles. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard bearing elements may be free-standing (e.g., substrateless) and optionally may be at least partially or fully leached to remove a metal-solvent catalyst initially used to sinter the polycrystalline diamond body.

In some embodiments, the superhard bearing element 210f may include a chamfer 215f, which may at least partially surround the bearing surface 211f. For example, the chamfer 215f may extend from the bearing surface 211f to a peripheral surface of the superhard bearing element 210f. Conversely, in an embodiment, at least a portion of the interface between the bearing surface 211f and the peripheral surface of the superhard bearing element 210f may have a sharp corner and/or edge. Also, as mentioned above, the bearing surface 211f may be substantially continuous and/or planar.

In addition, the superhard bearing element 210f may include a radially inward surface 216f that forms a concave shape (i.e., on the side surface facing toward the axis of rotation of the bearing assembly). Similarly, the superhard bearing element 210f may include a radially outward surface 217f that forms a convex shape of the superhard bearing element 210d. It should be appreciated, however, that the superhard bearing element may have some or all planar sides. Optionally, the superhard bearing element may have one, some, or all sides that have non-planar configuration. In any event, the bearing may have any suitable shape, such that the bearing elements may be arranged on a support ring in the same or a similar manner as described above.

Figure 10:
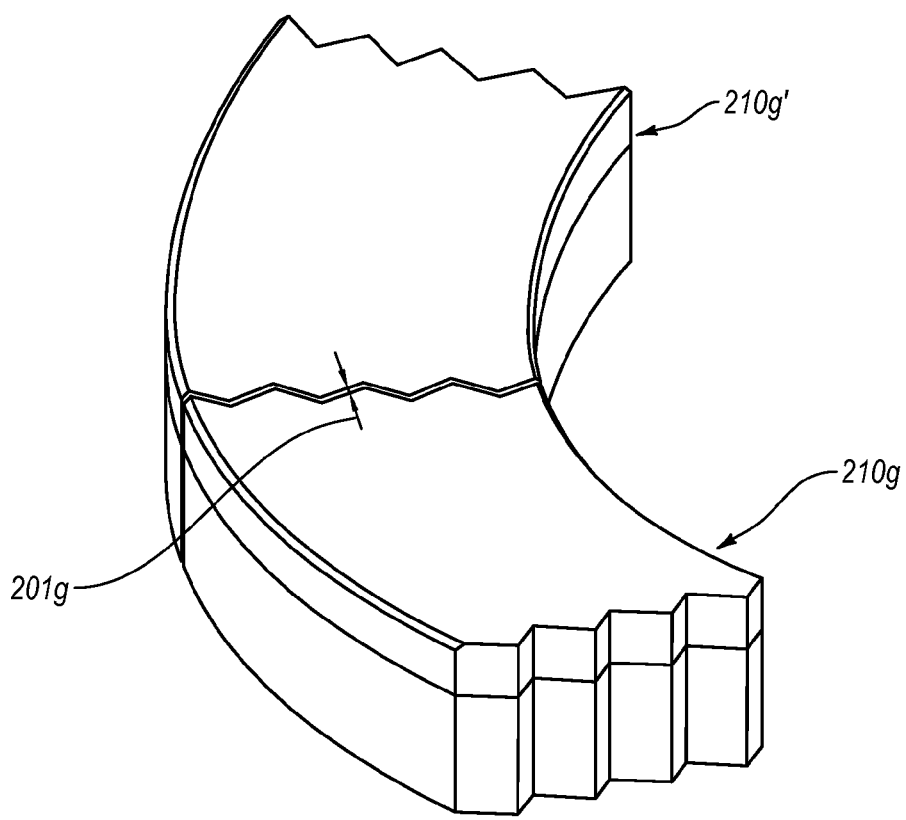
FIG. 10 is an isometric view of complementary-shaped bearing elements according to another embodiment.

For instance, the bearing elements may have shapes that may complement one another. In some embodiments, as shown in FIG. 10, an embodiment of a superhard bearing element 210g may include a side that has alternating shapes (e.g., zigzag shape) that may match or complement corresponding shapes of the adjacent superhard bearing element 210g'. Except as otherwise described herein, the superhard bearing elements 210g, 210g' and their materials, elements, features, or components may be similar to or the same as any of the superhard bearing elements 210a, 210b, 210b', 210c, 210d, 210d', 210e, 310a, 210f (FIGS. 1-9) and their respective materials, elements, features, and components.

For example, a first side of the superhard bearing element 210g may have a first shape, which may complement the shape of a second, opposing side of the circumferentially adjacent superhard bearing element 210g'. In some instances, the superhard bearing elements 210g and 210g' may be positioned next to each other in a manner that forms a channel 201g therebetween. In some embodiments, the channel 201g may have an approximately uniform thickness. Optionally, in an embodiment, the channel 201g may be sufficiently large to allow or facilitate fluid flow therein. In an embodiment, the complementary shapes of the superhard bearing elements 210g and 210g', may form a tortuous path through the channel 201g, may restrict or impede the flow of fluid therethrough (e.g., by alternating undulations).

Additional or alternative embodiments of suitable bearing elements that may have complementary shapes with one or more of the adjacent superhard bearing elements are described in more detail in U.S. Pat. No. 7,896,551, entitled "Hydrodynamic Bearing Assemblies, And Hydrodynamic Bearing Apparatuses And Motor Assemblies Using Same," filed on Oct. 15, 2007, and in U.S. patent application Ser. No. 13/480,932, entitled "Bearing Apparatuses And Motor Assemblies Using Same," filed on May 25, 2012. The entire disclosures of the aforementioned Patent and Patent Application are incorporated herein by this reference.

Figure 11:
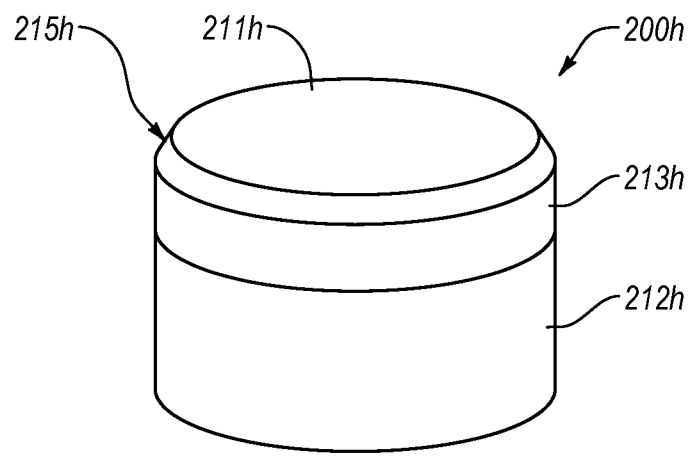
FIG. 11 is an isometric view of a bearing element according to yet another embodiment.

Embodiments also may include cylindrical bearing elements, such as a superhard bearing element 210h, shown in FIG. 11. Except as otherwise described herein, the superhard bearing element 210h and its materials, elements, features, or components may be similar to or the same as any of the superhard bearing elements 210a, 210b, 210b', 210c, 210d, 210d', 210e, 310a, 210f, 210g (FIGS. 1-10) and their respective materials, elements, features, and components. For example, the superhard bearing element 210h may include a superhard table 213h bonded to a substrate 212h. In some instances, the superhard bearing element 210h may include a chamfer 215h at least partially surrounding a bearing surface 211h thereof. Alternatively, the bearing surface 211h may be partially or entirely surrounded by a sharp edge.

It should be appreciated that, when positioned side-by-side and secured to a support ring, the superhard bearing elements 210h may have a non-linear or non-uniform gap (e.g., in thickness, depth, shape, etc.) therebetween. As such, the barrier element that may close or constrict the gap between the superhard bearing elements 210h may include a corresponding or complementary shape to the shapes of the portions of the peripheral surfaces of the superhard bearing elements 210h (e.g., a shape complimentary to the portions of the peripheral surfaces of the superhard bearing elements that are adjacent to the barrier element). In any event, the barrier element(s) may have suitable shapes that may at least partially block or obstruct fluid flow through and to the radially outer opening of the channel between the bearing elements.

Figure 12:
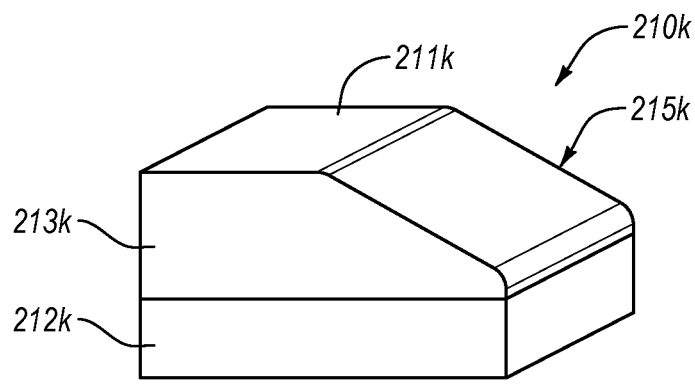
FIG. 12 is an isometric view of a bearing element according to still another embodiment.

Also, in some embodiments, one, some, or all of the bearing elements may include a ramp feature, which may facilitate flow of fluid toward the bearing surfaces of the bearing elements. For instance, as the fluid flow through the channel between the bearing elements is blocked or impeded by the barrier elements, the fluid may flow up to the bearing surfaces of the bearing elements, and a ramp feature may facilitate such flow. FIG. 12 illustrates an embodiment of a superhard bearing element 210k that includes a ramp feature 215k that may extend from a bearing surface 211k toward a substrate 212k. Except as otherwise described herein, the superhard bearing element 210k and its materials, elements, features, or components may be similar to or the same as any of the superhard bearing elements 210a, 210b, 210b', 210c, 210d, 210d', 210e, 310a, 210f, 210g, 210h (FIGS. 1-11) and their respective materials, elements, features, and components.

For instance, the ramp feature 215k may pass through a portion or all of a superhard table 213k. Additionally or alternatively, the ramp feature 215k may pass through a portion of the substrate 212k. In any event, the ramp feature 215k may facilitate fluid flow toward the bearing surface 211k. It should be appreciated that, while the ramp feature 215k is substantially planar, the superhard bearing elements may include a ramp of any suitable shape, size, or orientation. For example, the ramp may have a concave or a convex shape.

Moreover, the shape of the peripheral surface, which may define the general shape of the superhard bearing elements 210k, also may vary from one embodiment to the next. In some embodiments, as shown in FIG. 12, the superhard bearing elements 210k may be approximately rectangular. Alternatively, the superhard bearing element including the ramp feature may have any suitable shape, including but not limited to generally cylindrical, trapezoidal, triangular, among others.

Figure 13:
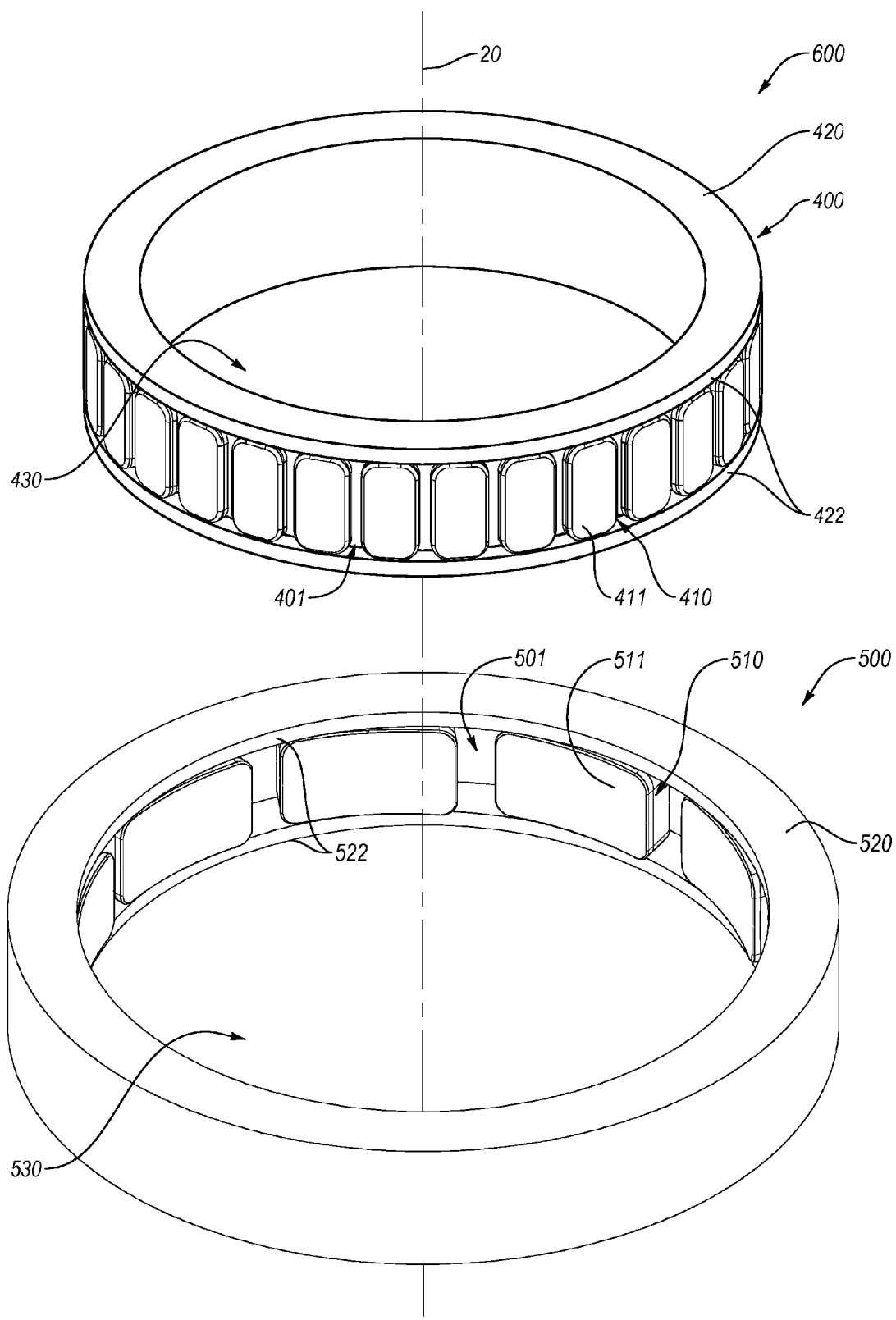
FIG. 13 is an isometric, exploded view of a radial bearing apparatus according to an embodiment.

While the above described embodiments relate to thrust-bearing assemblies and apparatuses, this disclosure is not so limited. FIG. 13 illustrates an embodiment of first and second radial bearing assemblies 400 and 500, which may be included in a radial bearing apparatus 600. The first radial bearing assembly 400 may be a rotor, and the second radial bearing assembly 500 may be a stator or vice versa. Also, in some embodiments, the first radial bearing assembly 400 and the second radial bearing assembly 500 may rotate relative to a fixed machine element or component as well as relative to each other. Except as otherwise described herein, the first and/or second radial bearing assemblies 400, 500 and their respective materials, elements, features, or components may be similar to or the same as any of the first thrust-bearing assemblies 200, 200a, 200b, 200b', 300b, 300b', 200c, 200d, 200d', 200e, 300 or the second thrust-bearing assemblies 300, 300a (FIGS. 1-8) and their respective materials, elements, features, and components.

The first and second radial bearing assemblies 400, 500 may include corresponding superhard bearing elements 410, 510, which may be secured to respective support rings 420, 520. Generally, the first radial bearing assembly 400 may be rotatably positioned inside the second radial bearing assembly 500. More specifically, the superhard bearing elements 410, 510 may have corresponding bearing surfaces 411, 515 that may face and engage one another in a manner that allows the first and second radial bearing assemblies 400, 500 to rotate relative to each other.

In an embodiment, a shaft (e.g., a drill shaft) or other machine component or element may pass into or through an opening 430 of the first radial bearing assembly 400 and may be secured thereto. The opening 430 may have any suitable shape, such as circular, square, rectangular, etc. In any event, in one embodiment, the shaft may be rotated together with the first radial bearing assembly 400, while the second radial bearing assembly 500 may remain stationary. For instance, the second radial bearing assembly 500 may be connected to and/or secured within a housing and may remain stationary relative thereto.

In an embodiment, the superhard bearing elements 510 may define an opening 530, which may accommodate the first radial bearing assembly 400 therein. In particular, the bearing elements 410 may engage the superhard bearing elements 510 in a manner that permits relative rotation of the first radial bearing assembly 400 and second radial bearing assembly 500 but limits relative lateral movement thereof. For instance, the first and second radial bearing assemblies 400, 500 may rotate relative to each other in a manner that respective center axes thereof remain approximately aligned with each other and with the axis of rotation 20.

At least one, some of, or each of the superhard bearing elements 510 may include a superhard table that has a concave bearing surface (e.g., curved to form an interior surface of an imaginary cylinder), such as the bearing surfaces 511. Similarly, at least one, some of, or each of superhard bearing elements 410 may include superhard tables that have convex bearing surface 411 that may correspond with the curvature of the bearing surfaces 511. In any event, the concave bearing surfaces 511 and the convex bearing surfaces 411 may be shaped, sized, positioned, and oriented to generally correspond with and engage one another during operation of the radial bearing apparatus.

In one or more embodiments, the superhard bearing elements 410 and/or 510 may be pre-machined to selected tolerances and mounted on and/or within the corresponding support ring 420 or 520. Optionally, the superhard bearing elements 410 and/or 510 may be first mounted on and/or in the respective support rings 420, 520 and then shaped (e.g., by grinding, lapping, electro-discharge machining ("EDM"), or combinations thereof) to form bearing surfaces 411, 511 thereof, so that the bearing surfaces 411 are shaped to engage the bearing surfaces 511. Optionally, one or more of the superhard bearing elements 410 and/or 510 may have a peripherally extending edge chamfer.

Also, the second radial bearing assembly 500 may include one or more channels 401 between adjacent superhard bearing elements 410 thereof. In some instances, fluid may enter the channels 401 between the superhard bearing elements 410 during operation of the radial bearing apparatus 600. Moreover, as noted above, in some examples, the first radial bearing assembly 400 may be a rotor. Hence, as the first radial bearing assembly 400 rotates about the center axis 20, the fluid within the channels 401 may be experience centrifugal forces, which may urge such fluid away from the axis of rotation 20 and out of the channels 401.

In some embodiments, the first radial bearing assembly 400 may include barrier elements 422, which may restrict or prevent flow of fluid within the channels 401. For example, the barrier elements 422 may prevent the fluid from flowing axially (i.e., along the axis 20) or in a direction approximately parallel to the axis of rotation 20. Blocking, obstructing, or restricting axial fluid flow may facilitate fluid flow to the bearing surfaces 411. For instance, centrifugal forces may produce higher pressure on the fluid within the channels 401 when the both openings of the channels 401 are blocked by the barrier elements 422, thereby urging the fluid from the channels 401 toward the bearing surfaces 411.

Similar to the barrier elements described above in connection with the thrust-bearing assemblies and apparatuses, the barrier elements 422 may include any suitable material and may be secured to or integrated with the support ring 420. In one embodiment, the barrier elements 422 may be integrated with the support ring 420 (e.g., by forming a groove or channel therebetween in the support ring 420). Furthermore, the outward facing surfaces of the barrier elements 422 may be approximately coplanar with the bearing surfaces 411. In other words, the outward facing surfaces of the barrier elements 422 may lie approximately along the same imaginary cylindrical surfaces as the bearing surfaces 411. Alternatively, the barrier elements 422 or portions thereof may be recessed or offset inwardly, such as to lie along an imaginary cylinder of a smaller diameter than the imaginary cylindrical surface containing the bearing surfaces 411.

Also, in some embodiments, the barrier elements 422 may be substantially continuous. Alternatively, however, the barrier elements 422 may be interrupted. For instance, interruptions in the barrier elements 422 may form independent posts or barrier elements, each of which may block or constrict one or more channels 401. In any event, the barrier elements 422 may block or prevent axial fluid flow through the channels 401 in a manner that facilitates fluid flow toward the bearing surfaces 411 during operation of the first radial bearing assembly 400.

Similarly, the second radial bearing assembly 500 may include barrier elements 522 that may at least partially enclose channels 501 between the superhard bearing elements 510. More specifically, in an embodiment, the barrier elements 522 may block or restrict axial fluid flow within the channels 501. For example, as noted above, the second radial bearing assembly 500 may rotate about the axis of rotation 20 and the fluid located in the channels 501, thus, may experience centrifugal forces. In other words, as the second radial bearing assembly 500 rotates about the axis of rotation 20, the fluid in the channels 501 may rotate together with the second radial bearing assembly 500 and may be urged outward, away from the axis of rotation 20.

As such, in some instances, the fluid may be urged against the support ring 520 and subsequently against the barrier elements 522, which collectively may further urge the fluid toward the bearing surfaces 511 of the second radial bearing assembly 500. Moreover, as noted above, both the first radial bearing assembly 400 and the second radial bearing assembly 500 may rotate about the axis of rotation 20. Consequently, in some embodiments, the fluid in the channels 401 and 501 may be forced toward and/or between the bearing surfaces 411 and 511. In any event, however, flowing fluid to the bearing surfaces 411 and/or 511 may facilitate formation of a fluid film between the bearing surfaces 411 and 511, which may facilitate hydrodynamic operation of the radial bearing apparatus 600.

Figure 14:
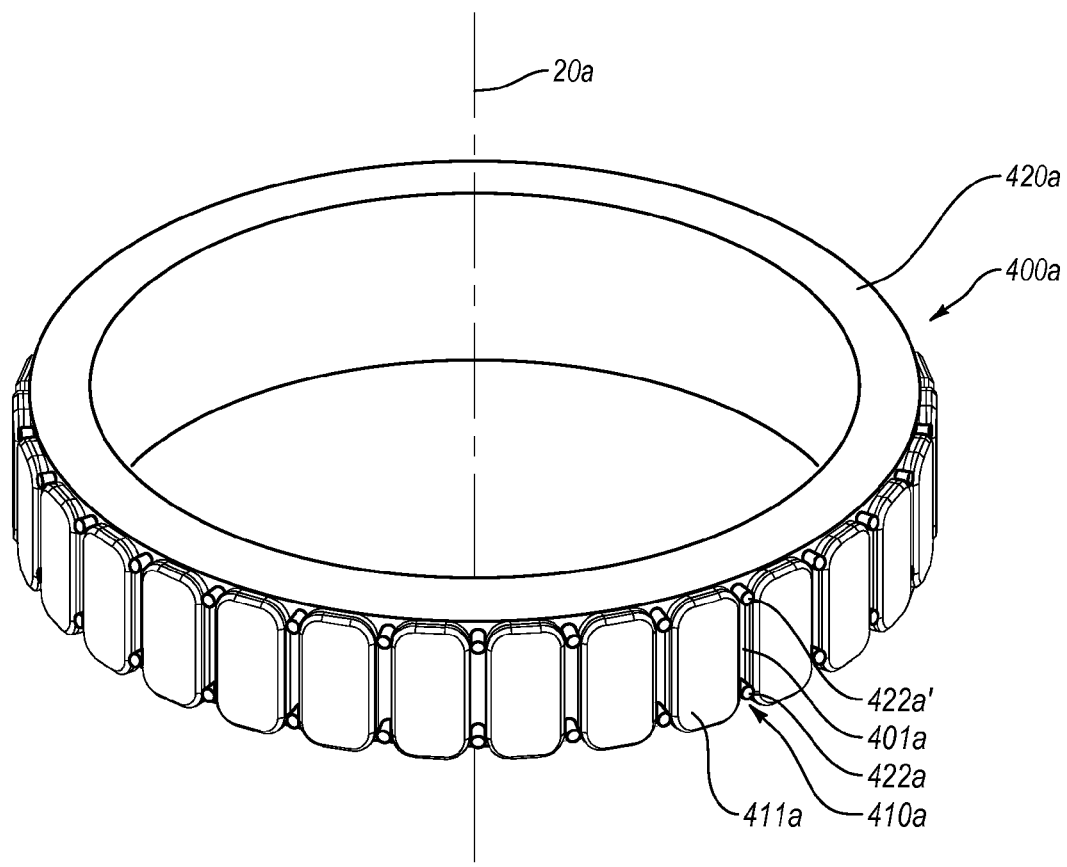
FIG. 14 is an isometric view of a radial bearing assembly according to an embodiment.

While in some embodiments, the barrier elements 422 may form a continuous ring and/or may be integrated with the support ring 420, this disclosure is not so limited. For instance, FIG. 14 illustrates a radial bearing assembly 400a according to at least one additional or alternative embodiment. Except as otherwise described herein, the first and/or second radial bearing assembly 400a and its respective materials, elements, features, or components may be similar to or the same as any of the first thrust-bearing assemblies 200, 200a, 200b, 200b', 300b, 300b', 200c, 200d, 200d', 200e, the second thrust-bearing assemblies 300, 300a (FIGS. 1-8), the radial bearing assemblies 400, 500 (FIG. 13), or combinations thereof, and their respective materials, elements, features, and components. For example, the radial bearing assembly 400a may include multiple barrier elements 422a, 422a' that may block or obstruct channels 401a between adjacent superhard bearing elements 410a.

In some instances, the barrier elements 422a, 422a' may be approximately cylindrical and may be secured to a support ring 420a of the radial bearing assembly 400a. Moreover, in an embodiment, the barrier elements 422a, and/or 422a' may include outward facing surface that may have a curvature that is substantially the same or similar to bearing surfaces 411a of the superhard bearing elements 410a. As such, the outward facing surfaces of the barrier elements 422a and/or 422a' may carry at least some of the load experienced by the radial bearing assembly 400a (i.e., the bearing surfaces 411a of the superhard bearing elements 410a and the outward facing surfaces of the barrier elements 422a, 422a' may engage and/or contact bearing surface(s) of an opposing radial bearing assembly).

Figure 15:
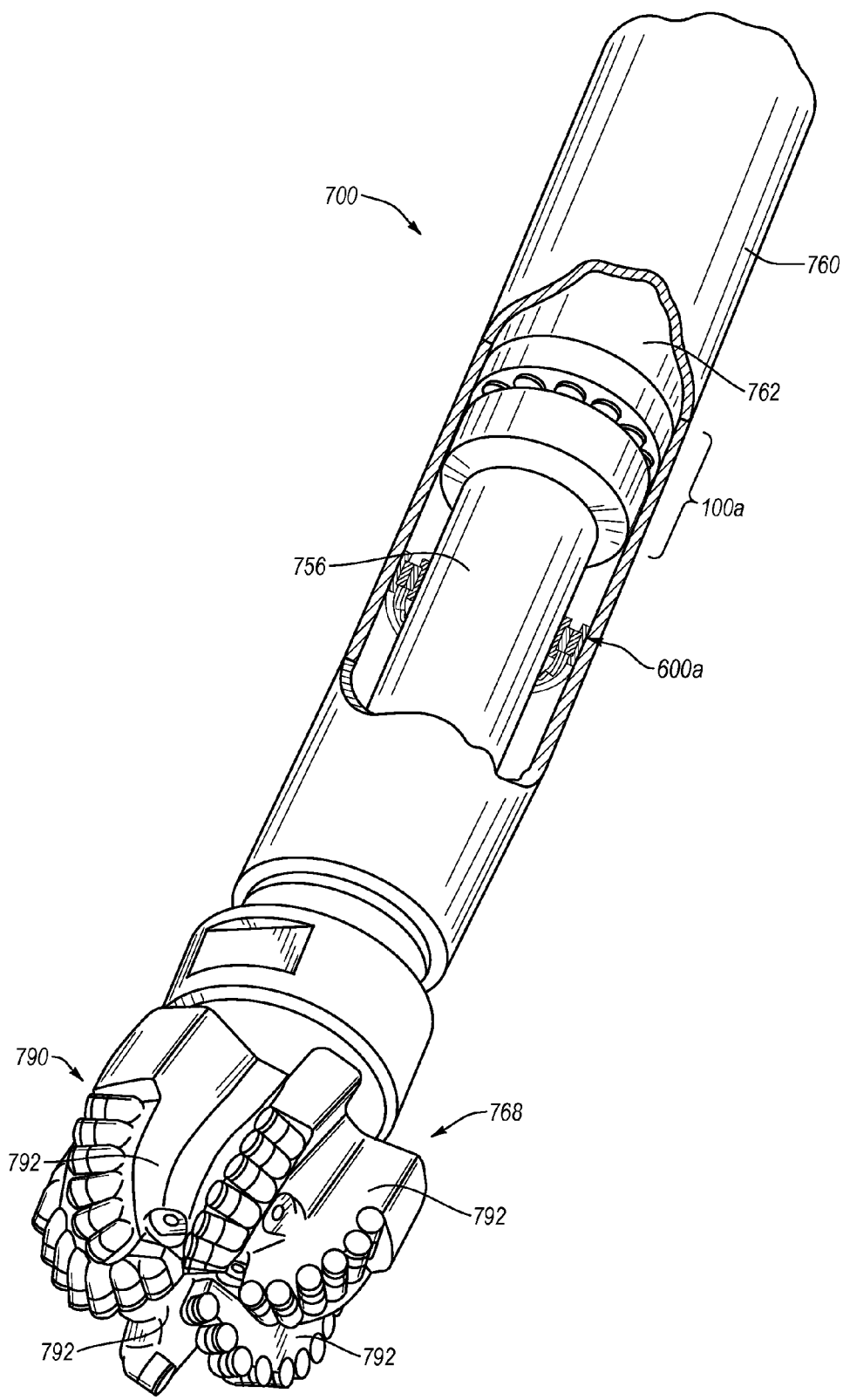
FIG. 15 is an isometric view of a subterranean drilling system according to an embodiment.

Any of the embodiments for thrust-bearing apparatuses and radial bearing apparatuses discussed above may be used in a subterranean drilling system. FIG. 15 is a schematic isometric cutaway view of a subterranean drilling system 700 according to an embodiment. The subterranean drilling system 700 may include a housing 760 enclosing a downhole drilling motor 762 (i.e., a motor, turbine, or any other device capable of rotating an output shaft) that may be operably connected to an output shaft 756. A thrust-bearing apparatus 100a may be operably coupled to the downhole drilling motor 762. The thrust-bearing apparatus 100a may be configured as any of the previously described thrust-bearing apparatus embodiments (e.g., thrust-bearing apparatus 100 shown in FIG. 1).

Additionally or alternatively, the subterranean drilling system 700 may include a radial bearing apparatus 600a operably connected to the output shaft 756 and/or to the housing 760. The radial bearing apparatus 600a may be configured as any of the previously described radial bearing apparatus embodiments (e.g., the radial bearing apparatus 600 shown in FIG. 13). For instance, the radial bearing apparatus 600a may include first radial bearing assembly (e.g., a stator) and second radial bearing assembly (e.g., a rotor) that maybe operably connected to the housing 760 and to the output shaft 756, respectively.

A rotary drill bit 768 may be configured to engage a subterranean formation and drill a borehole and may be connected to the output shaft 756. The rotary drill bit 768 is a fixed-cutter drill bit and is shown comprising a bit body 790 having radially-extending and longitudinally-extending blades 792 with a plurality of PDCs secured to the blades 792. However, other embodiments may utilize different types of rotary drill bits, such as core bits and/or roller-cone bits. As the borehole is drilled, pipe sections may be connected to the subterranean drilling system first thrust-bearing assembly thrust-bearing apparatus 100a to form a drill string capable of progressively drilling the borehole to a greater size or depth within the earth.

In operation, drilling fluid may be circulated through the downhole drilling motor 762 to generate torque and rotate the output shaft 756 and the rotary drill bit 768 attached thereto so that a borehole may be drilled. A portion of the drilling fluid may also be used to lubricate opposing bearing surfaces of the stators and rotors of the radial bearing apparatus 600a and/or of the thrust-bearing apparatus 100a. In some operating conditions, as mentioned above, the drilling fluid may facilitate hydrodynamic operation of the radial bearing apparatus 600a and/or of the thrust-bearing apparatus 100a.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
 a support ring;
 a plurality of bearing elements secured to the support ring, the plurality of bearing elements being positioned about a rotation axis of the support ring, at least two of the plurality of bearing elements spaced from one another to define a channel; and
 one or more barrier elements secured to the support ring and at least partially obstructing the channel, wherein the one or more barrier elements are positioned near a first opening of the channel, the one or more barrier elements include material that is softer than one or more of the superhard bearing surfaces or the support ring.

2. The bearing assembly of claim 1, wherein the at least some of the plurality of bearing elements include superhard bearing surfaces.

3. The bearing assembly of claim 2, further comprising another one or more barrier elements including one or more polycrystalline diamond compacts.

4. The bearing assembly of claim 2, wherein the one or more barrier elements have a top surface that is approximately coplanar with at least some superhard bearing surfaces.

5. The bearing assembly of claim 2, wherein the one or more barrier elements have a top surface extending beyond at least some of the superhard bearing surfaces.

6. The bearing assembly of claim 2, wherein the one or more barrier elements include one or more post.

7. The bearing assembly of claim 1, wherein the one or more barrier elements include one or more of aluminum, copper, brazes material, plastic, rubber, silicone, or polycrystalline diamond.

8. The bearing assembly of claim 1, wherein the one or more barrier elements are integrally formed with the support ring or separately formed from the support ring.

9. The bearing assembly of claim 1, wherein the one or more barrier elements at least partially obstruct a second opening of the channel.

10. The bearing assembly of claim 1, wherein the bearing assembly is a thrust-bearing assembly.

11. The bearing apparatus of claim 10, wherein each of the one or more bearing elements extends above the support ring to a plane that is substantially coplanar with at least some of the superhard bearing surfaces.

12. The bearing apparatus of claim 10, wherein each of the one or more barrier elements is positioned near a radially outer opening of a corresponding one of the channels.

13. The bearing assembly of claim 1, wherein the one or more barrier elements include one or more of aluminum, copper, braze material, plastic, rubber, or silicone.

14. The bearing assembly of claim 13, wherein the support ring includes steel.

15. A bearing apparatus, comprising:
   a first bearing assembly including one or more first bearing surfaces;
   a second bearing assembly including:
      a support ring;
      a plurality of bearing elements secured to the support ring and including a plurality of corresponding superhard bearing surfaces engaged with the one or more first bearing surfaces, at least some of the plurality of bearing elements being spaced from an adjacent one of the plurality of bearing elements by a channel; and
      one or more barrier elements that are sized and configured to retain fluid in the channel, wherein the one or more barrier elements are secured to the support ring, substantially completely block the channel, and include material that is softer than one or more of the superhard bearing surfaces or the support ring.

16. The bearing apparatus of claim 15, wherein at least some of the channel are approximately linear or have zigzag shapes.

17. The bearing apparatus of claim 15, wherein the first bearing assembly includes one or more tiltable bearing elements.

18. A method of operating a bearing apparatus, the method comprising:
   supplying fluid into one or more channels between bearing elements of one or more of a first bearing assembly or a second bearing assembly of the bearing apparatus;
   rotating one or more of the first bearing assembly or the second bearing assembly; and
   with one or more barrier elements that include material that is softer than one or more of the superhard bearing surfaces or the support ring, obstructing the fluid from exiting at least some of the one or more channels during rotation of one or more of the first bearing assembly or the second bearing assembly.

19. The method of claim 18, wherein preventing the fluid from exiting at least some of the one or more channels on outer sides thereof includes at least partially closing the openings of the one or more channels with one or more barrier elements.

20. The method of claim 18, further comprising rotating at least some of the fluid between bearing surfaces of the first bearing assembly and the second bearing assembly.

21. The method of claim 20, further comprising forming a fluid film between bearing surfaces of the first bearing assembly and the second bearing assembly.

22. The method of claim 18, wherein the one or more barrier elements substantially completely block corresponding ones of the one or more channels.

23. A bearing assembly, comprising:
   a support ring;
   a plurality of bearing elements secured to the support ring, the plurality of bearing elements being positioned about a rotation axis of the support ring, at least two of the plurality of bearing elements spaced from one another to define a channel; and
   one or more barrier elements secured to the support ring and at least partially obstructing the channel, wherein the one or more barrier elements are positioned near a first opening of the channel, at least one of the one or more barrier elements includes a polycrystalline diamond compact.

* * * * *